UNITED STATES PATENT OFFICE.

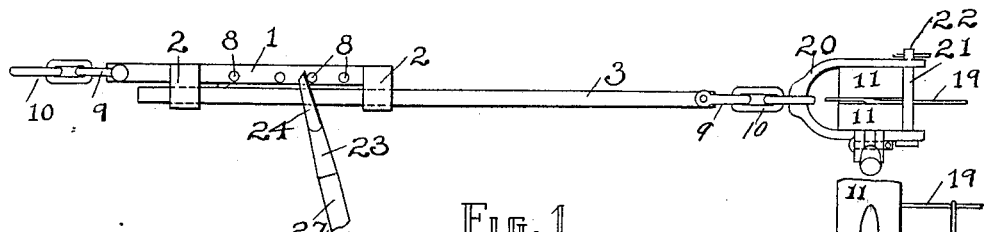

MARCENE E. HOBART, OF CHESTERFIELD, ILLINOIS.

WIRE-FENCE STRETCHER.

No. 825,906.          Specification of Letters Patent.          Patented July 17, 1906.

Application filed January 5, 1906. Serial No. 294,763.

*To all whom it may concern:*

Be it known that I, MARCENE E. HOBART, a citizen of the United States, residing at Chesterfield, in the county of Macoupin and State of Illinois, have invented certain new and useful Improvements in Wire-Fence Stretchers, of which the following is such a full, clear, and exact description as will enable those skilled in the art to which it appertains to make and use my said invention.

My invention relates to devices for stretching woven-wire fence.

The purposes of my invention are to provide a stretcher of compact and rigid construction adapted to stretch fence of different heights and so constructed and arranged that the pull on the fence will be central to the fence, to provide means for firmly clamping the fence during the operation of stretching, to provide a lever of improved construction for moving the stretcher-bar step by step, to provide means to prevent backward movement of the stretcher-bar, and provide means to prevent the slipping of the clamping device.

With these ends in view my invention consists in the novel features of construction and combinations of parts shown in the drawings hereto annexed and to which reference is hereby made and hereinafter particularly described, and finally recited in the claim.

Referring to the drawings, Figures 1 and 2 are respectively a top plan and side elevation of the complete device. Fig. 3 is an enlarged partial longitudinal section on the line 3 3 of Fig. 2. Fig. 4 is an enlarged partial vertical section on the line 4 4 of Fig. 2, and Fig. 5 is an enlarged horizontal section on the line 5 5 of Fig. 2.

Similar reference-numerals designate like parts in the several views.

A bar 1, preferably of steel, has integral box-shaped guides 2, in which a ratchet-bar 3 slides freely. On each side of the bar 3 are depressed ratchet-teeth 4, the points of which lie somewhat below the surface of the bar, so that in sliding through the guides 2 the teeth 4 will not rub on the guides. A pawl 5 is mounted to oscillate in a slot 7 in the bar 1, and a spring 6, having one end secured to the bar, acts against the pawl to hold the point of the pawl in engagement with the teeth 4 of the bar 1. On the bar 1 are fixed projecting pins 8. A clevis 9 and a chain 10 serve to connect the bar 1 with any suitable immovable object, such as a tree or a post planted in the ground.

Parallel bars 11, preferably of wood, are connected by a suitable number of bolts 12, the number of bolts varying according to the length of the bars. Nuts 13 or other securing devices on the bolts 12 keep the bolts in place on the bars. Levers 14 have a hinge connection with the bolts 12 and have cams 15, which bear on plates 16 on the bars 11, so that when the levers lie approximately parallel to the bars the bars will be pressed together, so as to firmly clamp the fence between them. On the adjacent faces of the bars 11 are secured alternate strips 17 of corrugated metal, separated by a space 18. When the bars 11 are pressed together, the strips 17 bearing on the strands of the fence 19 cause a slight bending of the strands in the space 18, as shown in Fig. 5, which prevents slipping of the strips on the strands. A yoke 20 fits around the bars 11 and is kept in place by a removable pin 21 passing through holes in the yoke and secured by a cotter-pin 22 or equivalent securing device.

A handle-holder 23, preferably of steel, has integral prongs 24 parallel to each other and at such distance apart that the bar 3 may slide between the prongs. The holder 23 also has an integral finger 25 between the prongs 24 and adapted to engage with the teeth 4 of the bar 3. It also has a socket 26, adapted to receive a wooden handle 27, fitting in the socket.

When the lever is in position for use, the prongs 24 rest against one of the pins 8 and the tooth 25 is in engagement with the teeth 4, as shown in Figs. 1 and 3. If, then, the free end of the lever be moved to the left, the tooth 25 will push against the teeth 4 of the bar 3 to slide the bar to the left, and as the bar slides to the left the point of the pawl 5 will engage with the teeth on the other side of the bar to prevent backward movement of the bar.

It will be seen that this construction and arrangement of the parts gives a very powerful leverage for moving the bar so as to effectively stretch a long section of wire fence.

It is desirable in practice that the bar 3 be so connected with the bars 11 as to exert a central pull on the fence which is being stretched.

In order to adjust the position of the bar 3 on the bars 11 according to the height of the fence, it is only necessary to withdraw the pin 21, set the yoke 20 in the desired position, and insert the pin through the mesh of the fence and through the holes in the yoke 20, so that the pin 21, supported on one of the strands 19, will prevent the yoke 20 from sliding downward on the bars 11.

The teeth 4 of the bar 3 being depressed below the surface of the bar leave along the side of the bar smooth surfaces 28, which slide in contact with the smooth inner walls of the guides 2, so that the bar 3 has a uniformly smooth movement in the guides.

Having fully described my invention, what I claim as new, and desire to secure by Letters Patent, is—

In an apparatus for stretching wire fence the combination of a guide-bar provided with integral guides and projecting pins, a pawl mounted on said bar, a stretcher-bar having teeth on both sides and adapted to slide in the guides on said guide-bar, and a lever having prongs fitting around said stretcher-bar and engaging with the pins on said guide-bar and also having a finger engaging with the teeth on one side of said stretcher-bar, the teeth on the opposite side of said stretcher-bar being engaged by said pawl.

In witness whereof I have hereunto subscribed my name, at Chesterfield, Illinois, this 27th day of July, 1905.

MARCENE E. HOBART.

Witnesses:
 EDWIN BANKS,
 EDWIN TOWSE.